(12) United States Patent
Eavenson et al.

(10) Patent No.: US 6,266,949 B1
(45) Date of Patent: Jul. 31, 2001

(54) METHODS OF EXCHANGING IMPLEMENTS AND CASTERS

(75) Inventors: Jimmy N. Eavenson, Aurora; David Lasley, Parma, both of OH (US)

(73) Assignee: Commercial Turf Products, Ltd., Streetsboro, OH (US)

( * ) Notice: Subject to any disclaimer, the term of this patent is extended or adjusted under 35 U.S.C. 154(b) by 0 days.

(21) Appl. No.: 09/460,309

(22) Filed: Dec. 13, 1999

Related U.S. Application Data

(62) Division of application No. 09/014,112, filed on Jan. 27, 1998, now Pat. No. 6,012,274.

(51) Int. Cl.$^7$ .................................................. A01D 34/66
(52) U.S. Cl. ...................................... 56/1; 56/16.7
(58) Field of Search .................... 56/13.5, 16.9, 56/2, 1, 16.7; 74/16; 16/30, 43, 18 R; 172/42

(56) References Cited

U.S. PATENT DOCUMENTS

| | | | |
|---|---|---|---|
| 3,040,590 | * 6/1962 | Smithburn | 74/16 |
| 3,603,162 | * 9/1971 | Gohler | 172/42 X |
| 4,325,211 | 4/1982 | Witt et al. | 56/15.8 |
| 4,914,894 | 4/1990 | Geiger | 56/14.7 |
| 5,020,310 | 6/1991 | Oshima et al. | 56/17.2 |
| 5,251,428 | * 10/1993 | Gay | 56/16.7 |
| 5,251,429 | 10/1993 | Minato et al. | 56/17.2 |
| 5,355,665 | 10/1994 | Peter | 56/15.8 |
| 5,742,977 | * 4/1998 | Hoofe, III | 16/30 |

* cited by examiner

*Primary Examiner*—Robert E. Pezzuto
(74) *Attorney, Agent, or Firm*—Emerson & Skeriotis; Roger D Emerson; Timothy D Bennett

(57) ABSTRACT

A method of exchanging a first implement for a second implement on a mower is disclosed. First, the first implement is disconnected from the mower and then the mower is adjusted to accommodate the second implement. The second implement is then operatively connected to the mower. The mower comprises frame receiving brackets and side frame members that are moved with respect to one another to adjust the mower to accommodate the second implement. A method of exchanging castor wheels is also included. The castor wheels, initially connected to an axle member, are disconnected from the axle member. Then, the position of the axle member with respect to the frame is adjusted, such as by being rotated approximately 180°. finally, different castor wheels are connected to the axle member.

11 Claims, 10 Drawing Sheets

METHODS OF EXCHANGING IMPLEMENTS AND CASTERS

This application for U.S. patent is a divisional application of U.S. patent application Ser. No. 09/014,112, filed Jan. 27, 1998, now U.S. Pat. No. 6,012,279.

BACKGROUND OF THE INVENTION

I. Field of the Invention

This invention pertains to the art of methods and apparatuses for a lawn mower, and more specifically to the art of methods and apparatuses for a lawn mower having an adjustable frame assembly.

II. Description of the Related Art

Walk-behind lawn mowers are well known. Such mowers are termed walk-behind because the operator walks behind the mower during its operation. Known walk-behind mowers have proven to be adequate for their intended purpose. However, they are also known to have a general lack of flexibility when exchanging implements. By implements it is meant any device that attaches to the mower and is operated by the mower. The most typical mower implement is a mower deck that contains at least one blade for cutting associated vegetation such as a lawn. Other possible implements would include a snow blower, for example.

One known problem deals with the difficulty in disengaging a first implement and then engaging a second implement. Typically, several nut and bolt combinations must be disconnected and then reconnected. Such connections are cumbersome and expend too much time.

Another problem is that the frames of known mowers are not readily adjustable. Thus, exchanging a first implement with a second implement of a different size or type is quite difficult if not impossible.

Still another problem deals with mowers using castor wheels. It may be desirable, for example when changing to a larger sized implement, to change the size of the wheels used on the mower. When castor wheels are used, it typically requires a change in axles to change the size of the castor wheels. This is also cumbersome and requires more than one axle for the same mower.

The present invention provides methods and apparatuses for reducing these problems. The difficulties that are inherent in the art are therefore overcome in a way that is simple and efficient, while providing better and more advantageous results.

SUMMARY OF THE INVENTION

According to one aspect of the present invention, a mower includes a power head, an adjustable frame assembly for use in selectively supporting a first implement, frame connecting means for use in connecting the adjustable frame assembly to the power head, power connecting means for use in connecting power from the power head to the first implement, and implement connecting means for use in selectively connecting the first implement to the adjustable frame assembly. The adjustable frame assembly can be adjusted such that the mower can also support a second implement that may be of a different size or type. The power connecting means can also connect power from the power head to the second implement.

According to another aspect of the present invention, one or more quick release pins are used to connect the first and second implements to the adjustable frame assembly.

According to another aspect of the present invention, an adjustable axle assembly is provided for use with an associated frame. The adjustable axle assembly includes an axle member operatively connected to the associated frame and a first castor pivot member operatively connected to the axle member. The first castor pivot member has first and second castor openings for selectively receiving first and second associated castor wheels.

According to still another aspect of the present invention, a method is provided for exchanging a first implement operatively connected to a mower with a second implement. The mower includes a power head and a frame assembly. The method includes the steps of disengaging a first quick release pin operatively connecting the first implement to the frame assembly, disconnecting power connecting means that connects power from the power head to the first implement, removing the first implement, moving the second implement into place with respect to the frame assembly, engaging the first quick release pin thereby operatively connecting the second implement to the frame assembly and connecting the power connecting means from the power head to the second implement.

According to still another aspect of the present invention, a method for exchanging a first castor wheel operatively connected to an adjustable axle assembly with a second castor wheel is provided. The adjustable axle assembly is operatively connected to an associated frame and includes a first castor pivot member operatively connected to an axle member. The first castor pivot member has first and second openings for selectively receiving the first and second castor wheels. The method includes the steps of disconnecting the first castor wheel from the first opening of the first castor pivot member, adjusting the position of the axle member with respect to the associated frame, and connecting the second castor wheel to the second opening of the first castor pivot member.

One advantage of the present invention is that the adjustable frame assembly permits implements to be easily exchanged on the mower.

Another advantage of the present invention is that the use of one or more quick release pins makes it very easy to disengage a first implement and then engage a second implement.

Another advantage of the present invention is that implements of various sizes and types can be connected to this same adjustable frame assembly.

Still another advantage of the present invention is that castor wheels can be easily exchanged. This is especially beneficial when the castor wheels are of different size.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
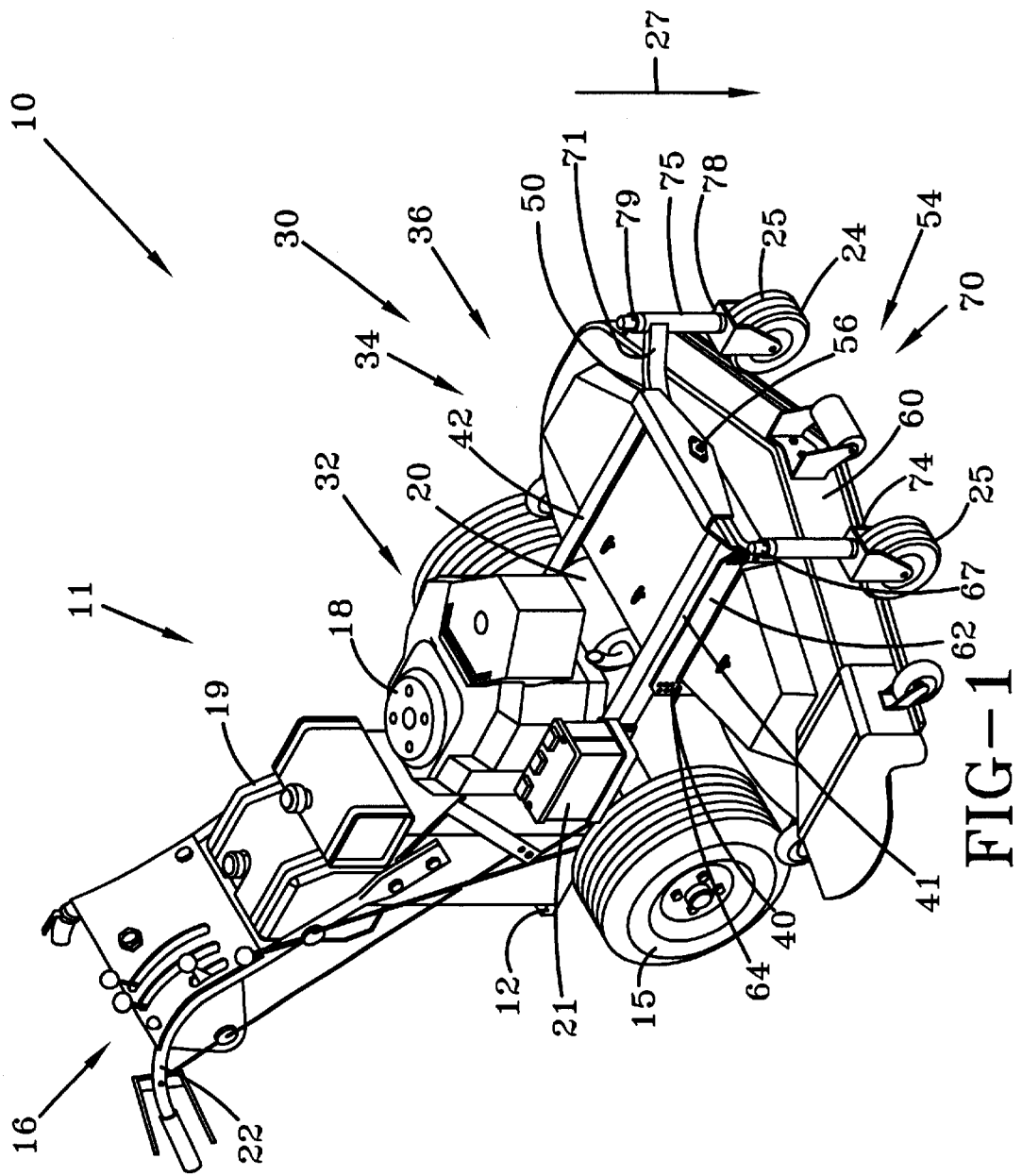
FIG. 1 is a perspective front view of the mower of the present invention showing the adjustable frame assembly supporting the first implement and being connected to the power head.

Referring now to the drawings, which are for purposes of illustrating a preferred embodiment of the invention only, and not for purposes of limiting the same, FIGS. 1–6 show a mower 10 in accordance with this invention. Although this preferred embodiment is directed to a walk-behind mower, the invention is also applicable to other mowers and other applications as well. The mower 10 includes a power head 11 and an adjustable frame assembly 30 that is used in selectively supporting a first implement 60 that can be of any size or type chosen with sound engineering judgement. The first implement 60 may be, for example, a mower deck as shown in FIGS. 1–3 and 5–6, a snow blower (not shown) or any other type of implement. It should be noted that the first implement 60 may be a floating mower deck. Floating mower decks, as is commonly known in the art, are mower decks that may articulate, that is pivot, with respect to the frame assembly. This eases the use of the mower 10 over uneven terrain. The adjustable frame assembly 30 may also be adjusted to, alternatively, support a second implement 61 (shown in FIG. 4) that also can be of any size or type chosen with sound engineering judgement. The power head 11 provides power to the implement (either the first implement 60 or the second implement 61) to operate the implement.

Figure 2:
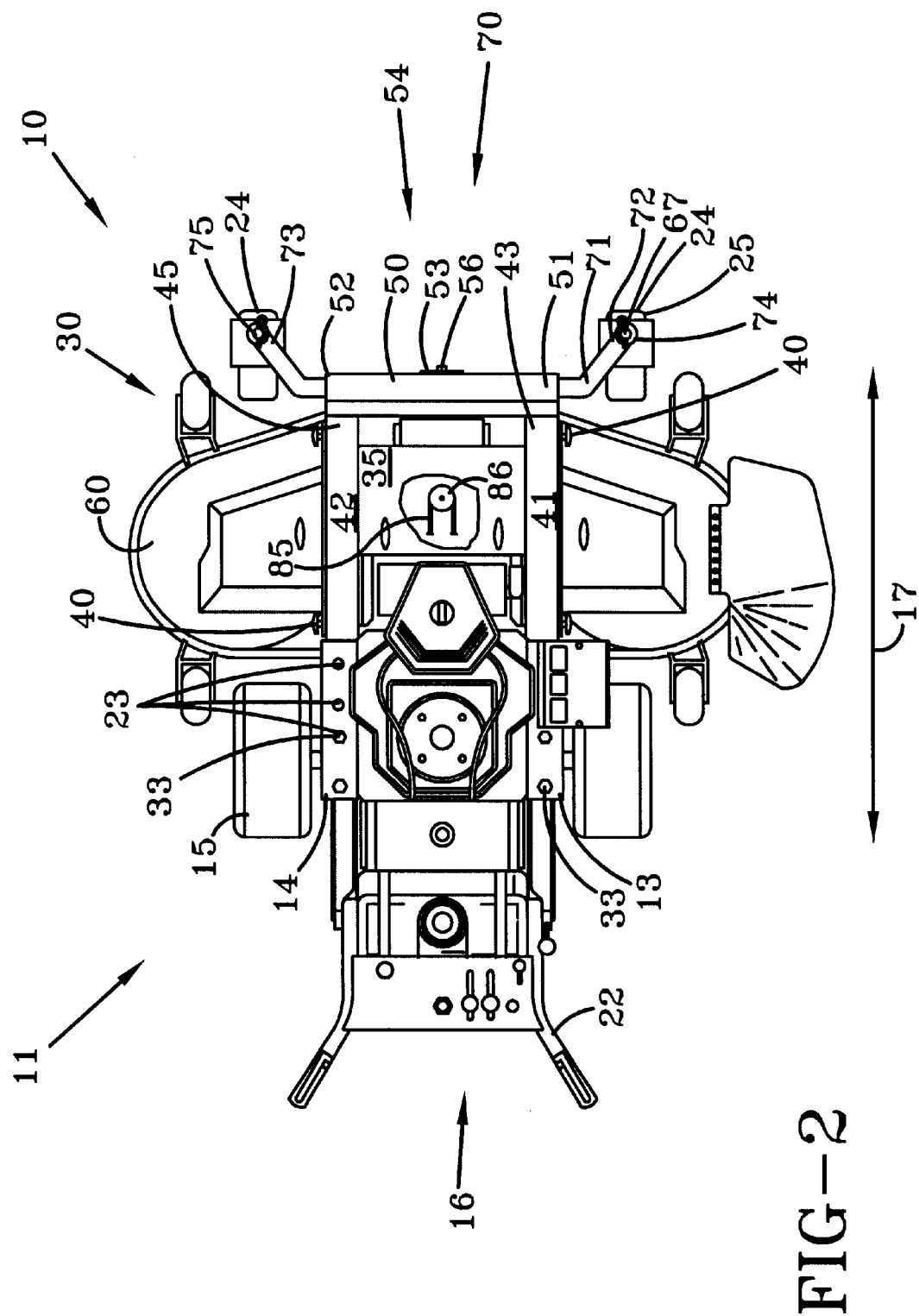
FIG. 2 is a plan view of the mower of FIG. 1 showing the quick release pins used to form the implement connecting means that connects the implement to the adjustable frame assembly and showing in cut-away fashion the belt and implement pulley that comprise the power connecting means.
Figure 3:
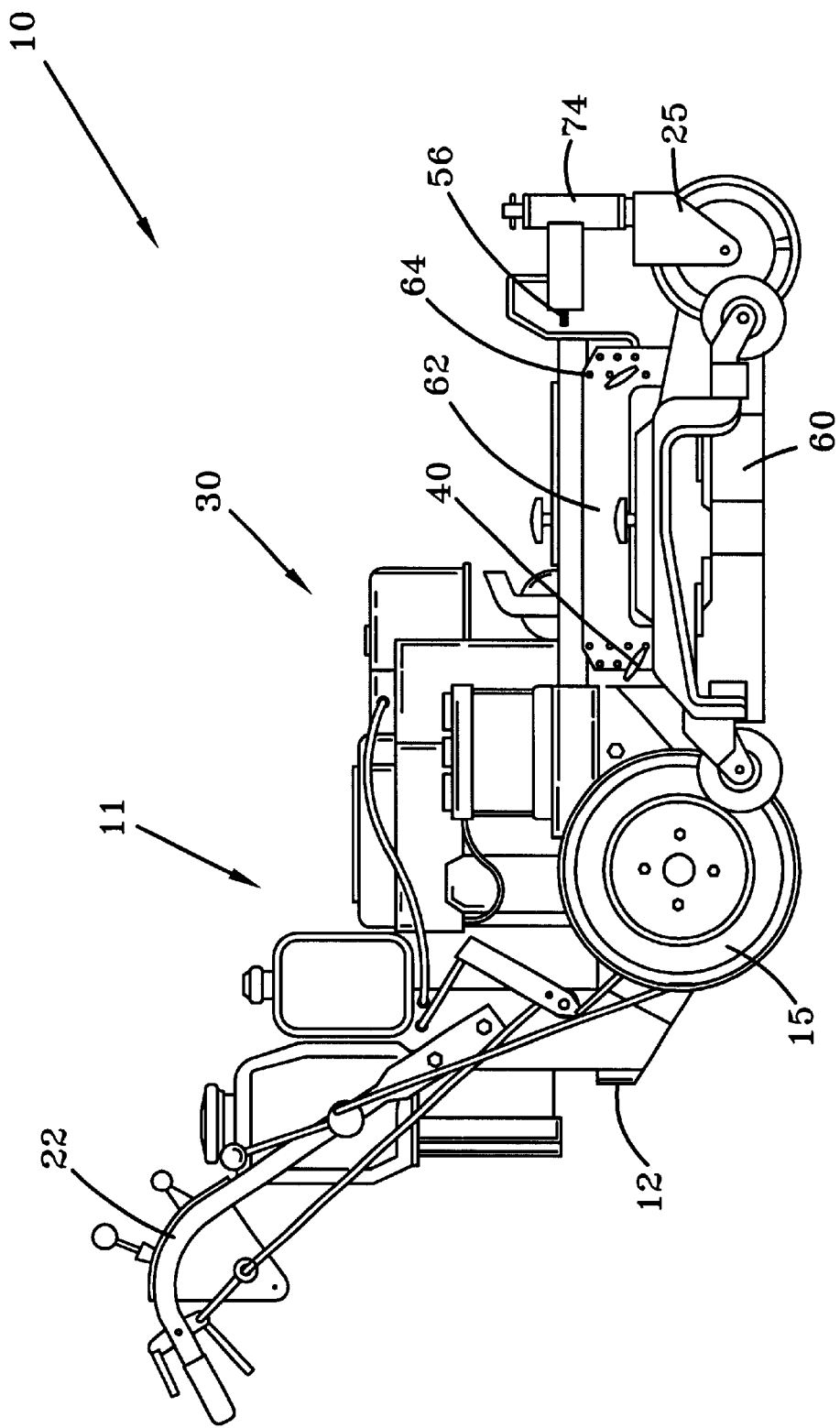
FIG. 3 is a left side elevation view of the mower of FIG. 1 showing the first implement being supported by the adjustable frame assembly.
Figure 4:
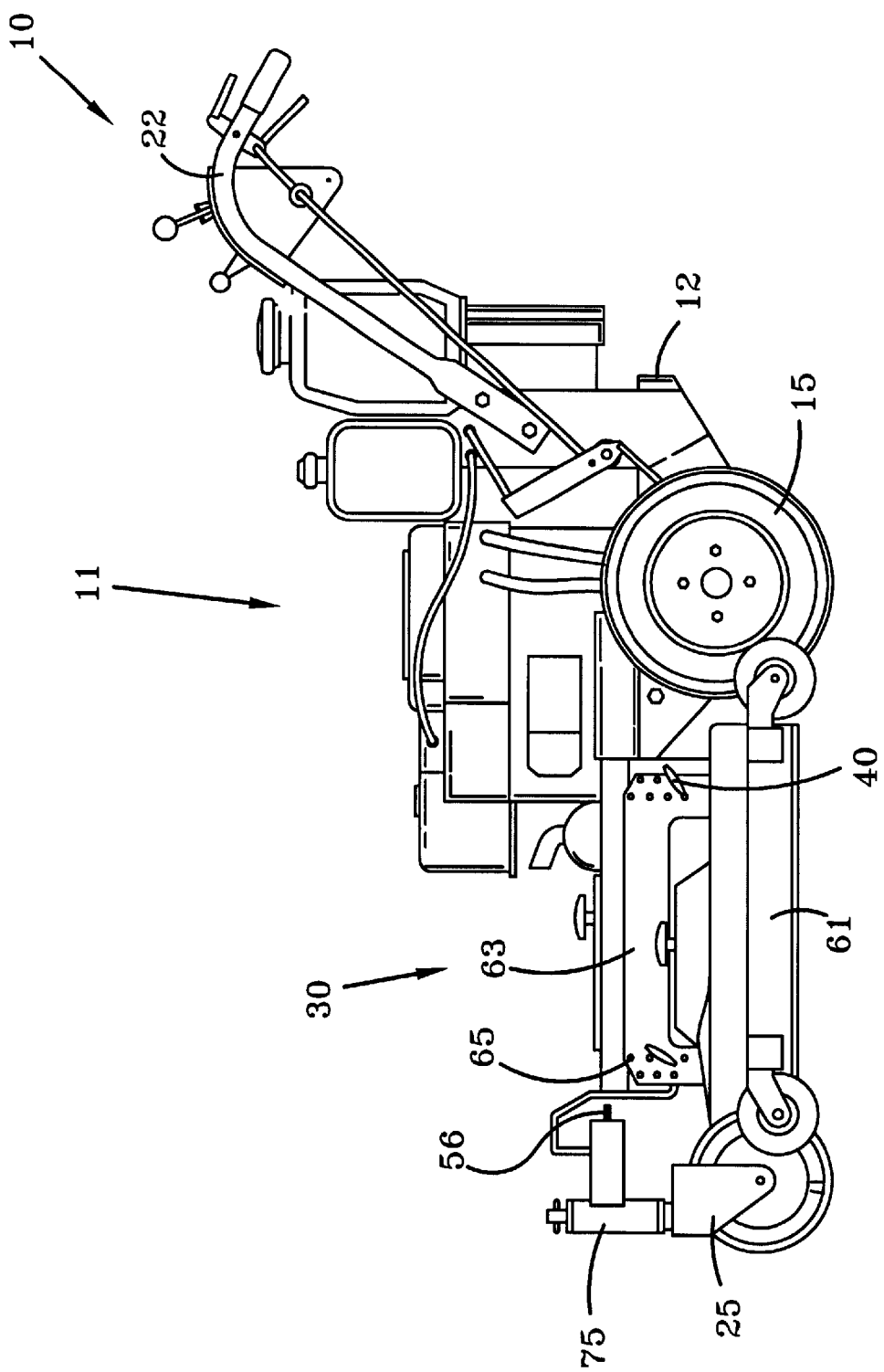
FIG. 4 is a right side elevation view of the mower of FIG. 1 showing the second implement being supported by the adjustable frame assembly.
Figure 5:
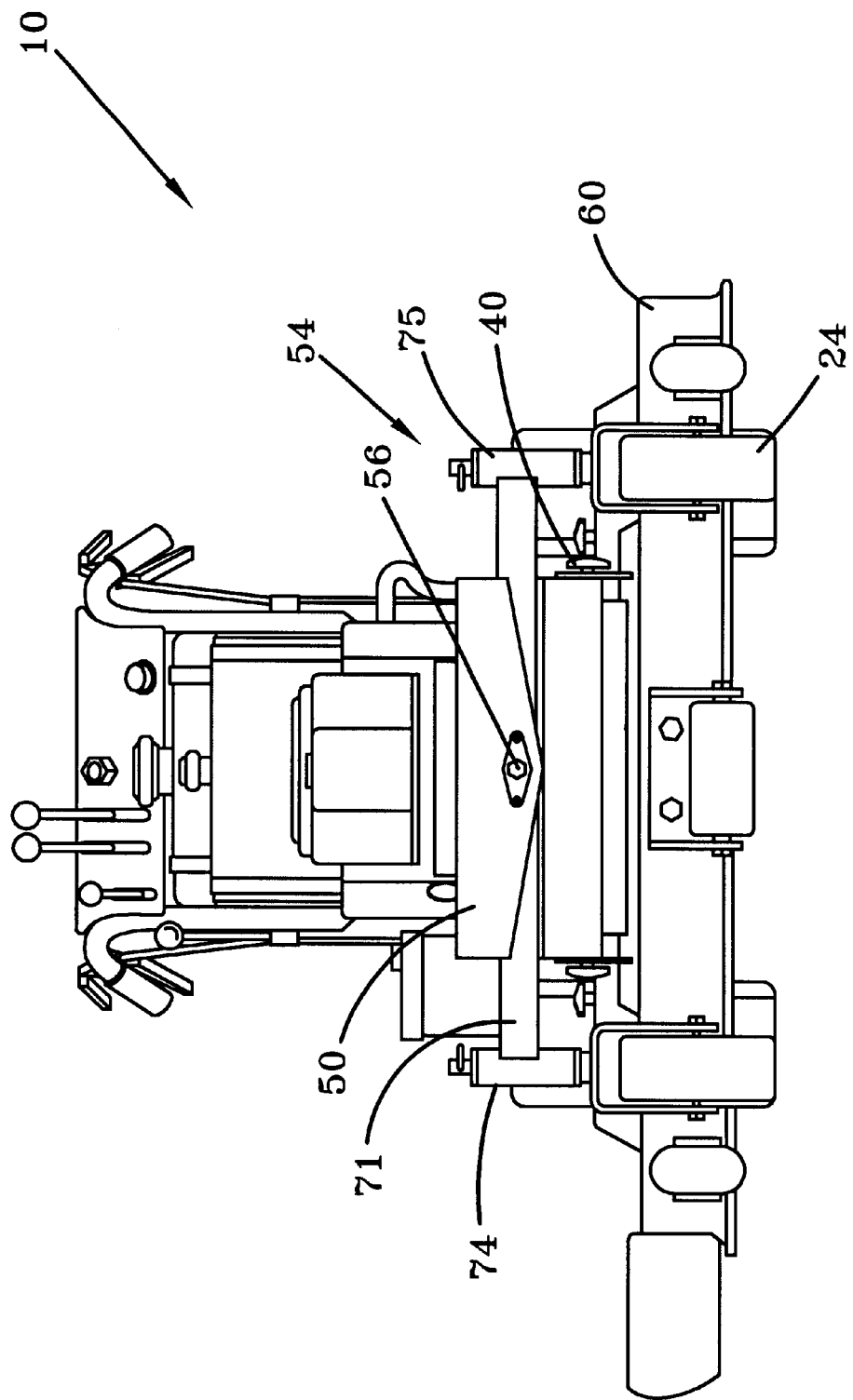
FIG. 5 is a front elevation view of the mower of FIG. 1 showing the rod used to form the preferred articulating means by which the adjustable axle assembly is pivoted.
Figure 6:
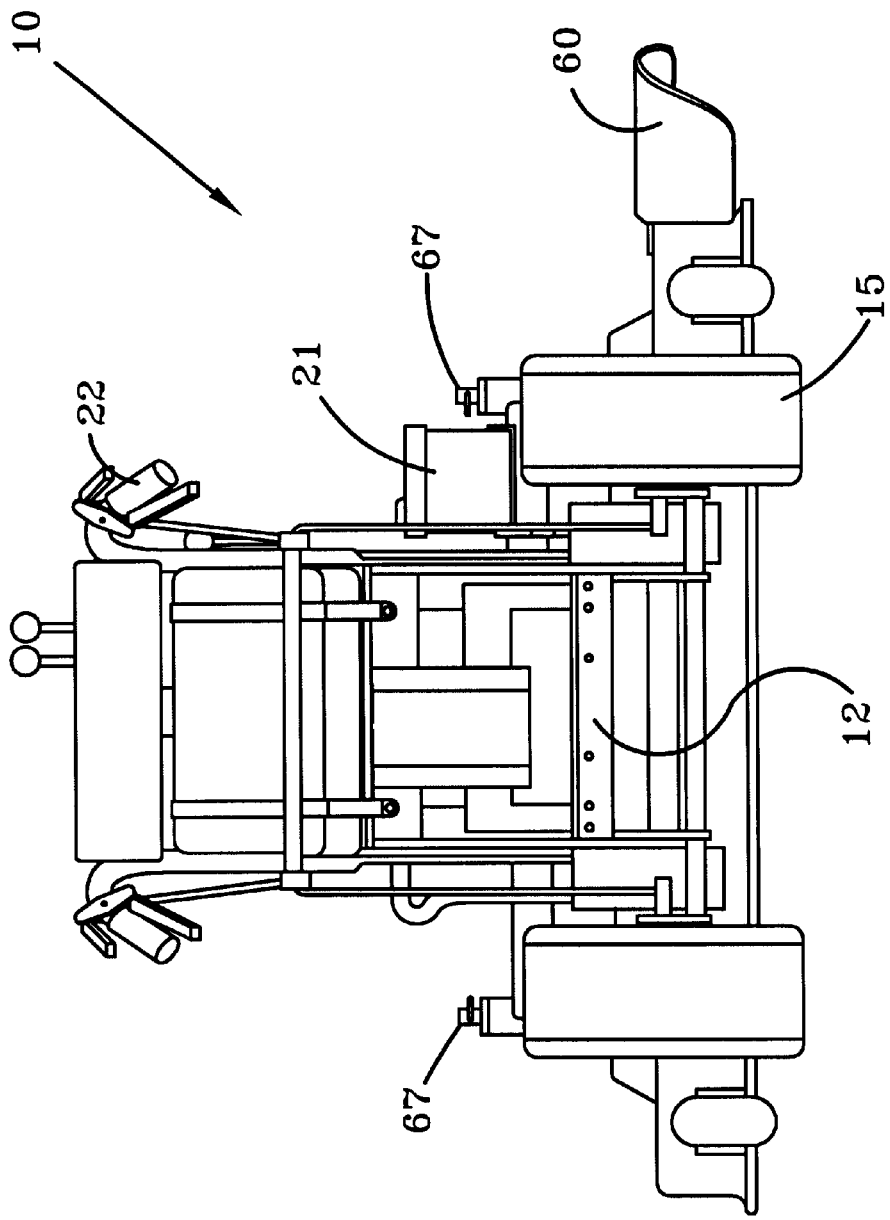
FIG. 6 is a back elevation view of the mower of FIG. 1 showing a portion of the power head frame.

With reference to FIGS. 1–2 and 6, the power head 11 includes a power head frame 12 that may have first and second frame receiving brackets 13, 14. The power head frame 12 may be used to support one or more back wheels 15, a control system 16, and an engine 18. The control system 16 and the engine 18 can be of any type chosen with sound engineering judgement. Thus, the power head 11 may also include a fuel tank 19, a muffler 20, and a battery 21. It is to be understood that any and all necessary components for the power head 11 are supported on the power head frame 12. The control system 16 may be mounted upon a handle 22 which itself is supported by the power head frame 12.

With reference now to FIGS. 1–4, frame connecting means 32 is used in connecting the adjustable frame assembly 30 to the power head 11 and will be discussed further below. Power connecting means 34 is used to connect power from the power head 11 to the first or second implement 60, 61. The power connecting means 34 can be of any type chosen with sound engineering judgement. In the illustrated embodiment, the power connecting means 34 is located under a cover 35 as shown in FIG. 2. In this case, the power connecting means 34 includes a first belt 85 operatively connecting the engine 18 to an implement pulley 86. In this way the rotation of the engine 18 is transmitted to a rotation of the implement pulley 86 for operation of the implement. This is well known in the art and thus will not be discussed in detail. Implement connecting means 36 is used in selectively connecting the first or second implement 60, 61 to the adjustable frame assembly 30. This will be discussed further below.

Figure 7:
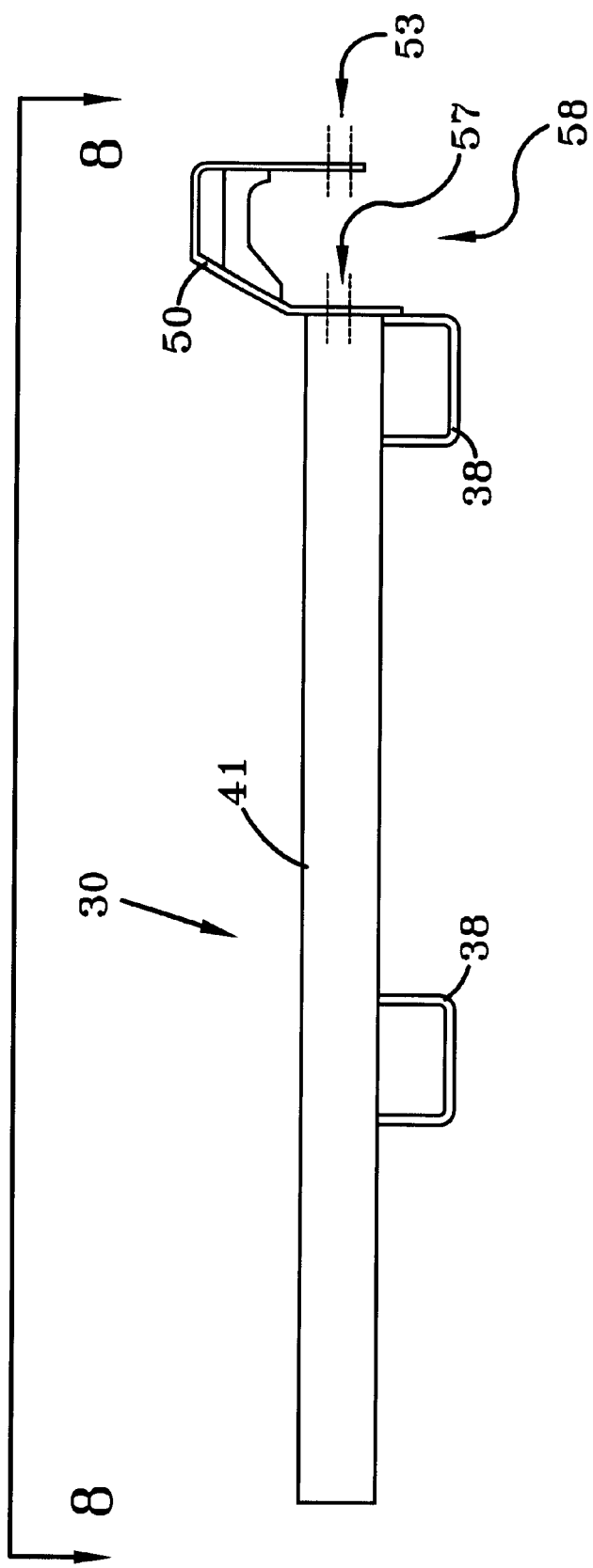
FIG. 7 is a side elevation view of the adjustable frame assembly showing the hangers connected to the first side frame member and the first and second rod openings in the axle housing member.
Figure 8:
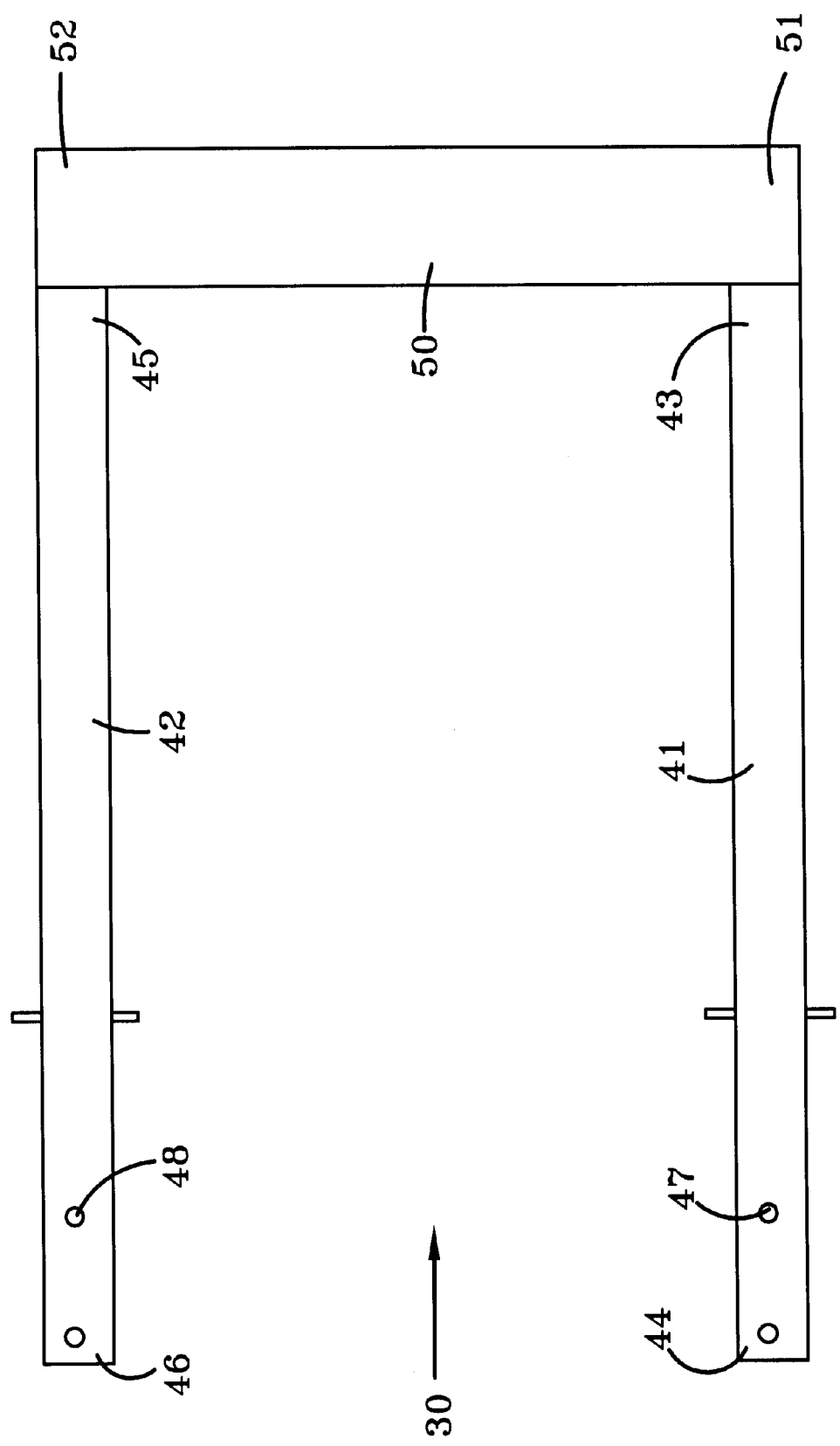
FIG. 8 is a plan view taken along the line 8—8 of FIG. 7 showing the holes in the second ends of the first and second side frame members.
Figure 9:
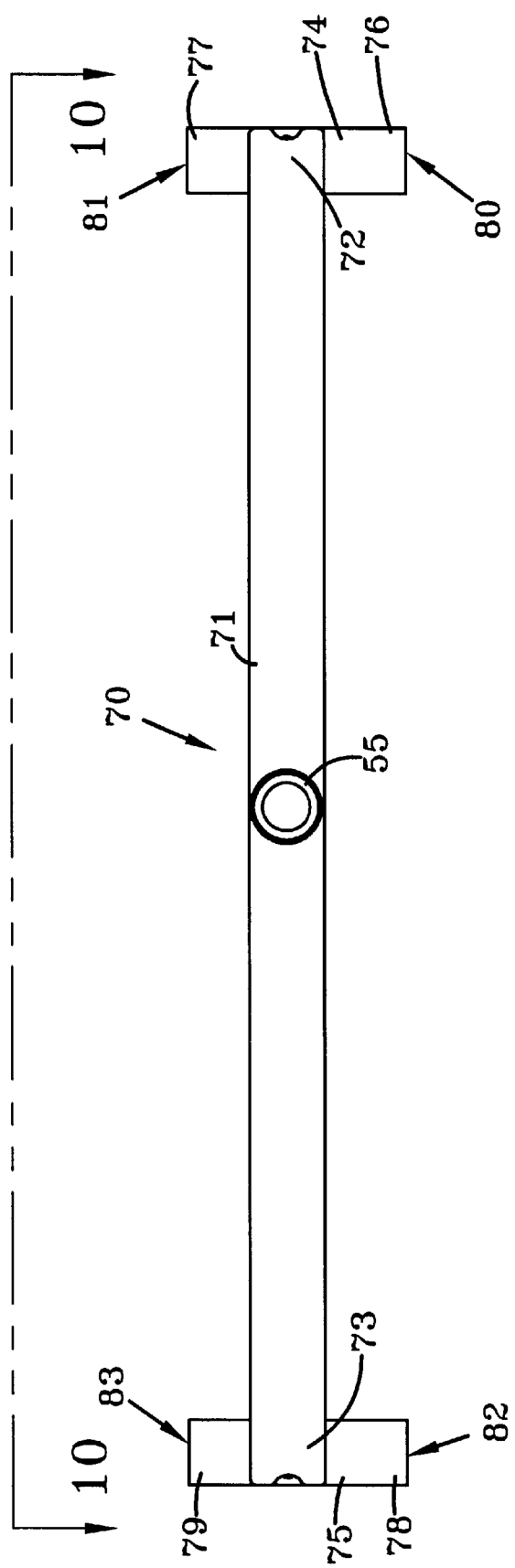
FIG. 9 is a back elevation view of the adjustable axle assembly showing the first and second castor pivot members connected to the first and second ends of the axle member.
Figure 10:
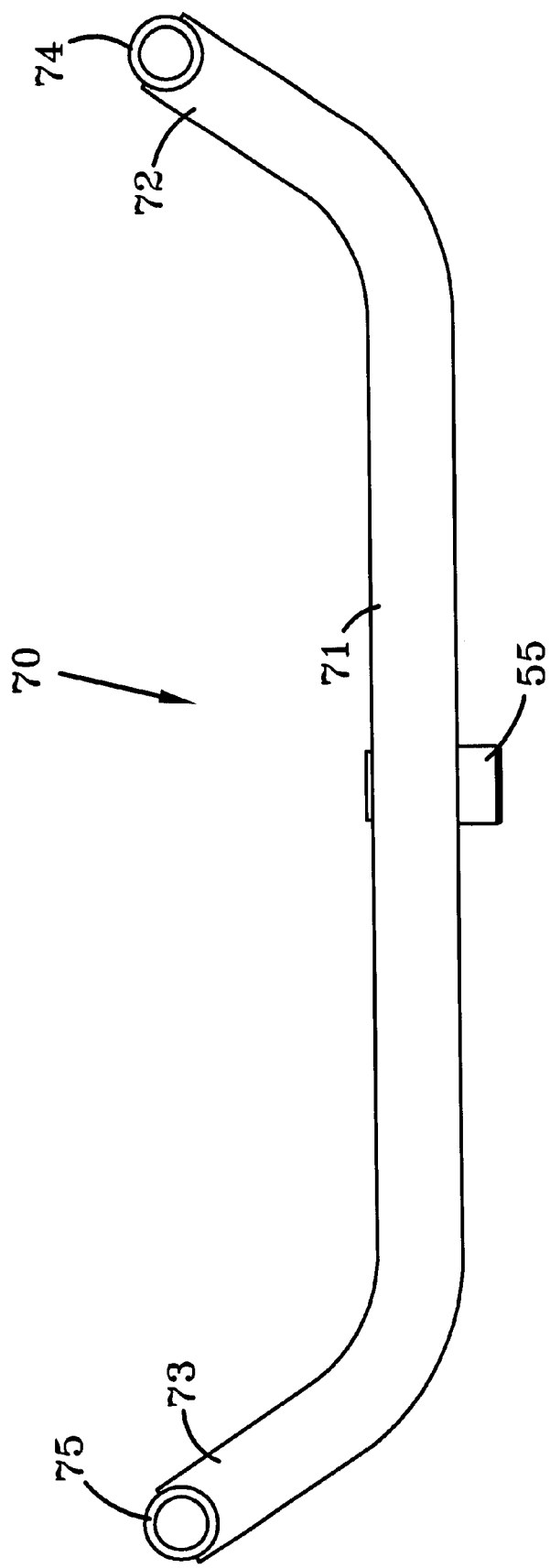
FIG. 10 is a plan view taken along the line 10—10 of FIG. 9 showing the arcuate shape of the axle member.

With reference now to FIGS. 1–3 and 7–8, the adjustable frame assembly 30 may have one or more front wheels 24 mounted thereon. The adjustable frame assembly 30 also includes first and second side frame members 41, 42 each having first and second ends 43, 45 and 44, 46 respectively. The second ends 44, 46 of the first and second side frame members 41, 42 may have first and second holes 47, 48 respectively for use with the frame connecting means 32. Preferably one or more hangers 38 are fixedly connected to the adjustable frame assembly 30. Any number of hangers 38 may be, for example, welded to the bottoms of the first and second side frame members 41, 42 as shown in FIG. 7. The hangers 38 are used with the implement connecting means 36 as will be discussed further below. The adjustable frame assembly 30 also includes an axle housing member 50 having first and second ends 51, 52 and an axle slot 58. The axle slot 58 is used to operatively receive any axle assembly chosen with sound engineering judgement such as an adjustable axle assembly 70 that will be discussed further below. The first end 51 of the axle housing member 50 is fixedly attached to the first end 43 of the first side frame member 41 and the second end 52 of the axle housing member 50 is fixedly attached to the first end 45 of the second side frame member 42. In this way the first and second side frame members 41, 42 and the axle housing member 50 form a rigid frame construction.

With reference now to FIGS. 1–4 and 8, the frame connecting means 32 will now be discussed in more detail. The first and second frame receiving brackets 13, 14 of the power head frame 12 are formed to receive the second ends 44, 46 of the first and second side frame members 41, 42. The first and second side frame members 41, 42 may fit within the first and second frame receiving brackets 13, 14 as shown in FIG. 2 or alternatively, the first and second frame receiving brackets 13, 14 may fit within the first and second side frame members 41, 42. In either case, the first and second side frame members 41, 42 can be easily slidden along the first and second frame receiving brackets 13, 14. It was noted above that the second ends 44, 46 of the first and second side frame members 41, 42 have first and second holes 47, 48 respectively. Thus, it can be easily understood that bolts 33 or other such attaching means can be positioned within the first and second holes 47, 48 of the first and second side frame members 41, 42 and through corresponding holes 23 in the first and second frame receiving brackets 13, 14. In this way the adjustable frame assembly 30 can be connected to the power head 11. Since the first and second side frame members 41, 42 can be easily slidden along the first and second frame receiving brackets 13, 14, they can be connected at a plurality of locations on the first and second frame receiving brackets 13, 14. In this way the position of the adjustable frame assembly 30 can be adjusted longitudinally (along the axis of line 17 shown in FIG. 2) with respect to the power head frame 12. This makes the exchange of implements of differing size or type an easy operation as will be discussed further below.

With reference now to FIGS. 1–4, the implement connecting means 36 that is used to selectively connect the first or second implement 60, 61 to the adjustable frame assembly 30 will now be discussed. It is preferred that the first implement 60 have first and second brackets 62, 63 each having a plurality of slots 64, 65 respectively. In this preferred embodiment the implement connecting means 36 includes one or more quick release pins 40. The quick release pins 40 can be of any type chosen with sound engineering judgement. The number of quick release pins 40 required will depend on the design of the mower 10 though four quick release pins 40 are used in the embodiment shown in FIG. 2. The quick release pin 40 is extended through the first slot 64 of the first bracket 62 of the first implement 60 and then through the hanger 38 mounted to the first side frame member 41 of the adjustable frame assembly 30. In this way, the first implement 60 is connected to the adjustable frame assembly 30. It should be noted that the same implement connecting means 36 can also connect the second implement 61 (shown in FIG. 4) in the same manner to the adjustable frame assembly 30. As is well known in the art, the quick release pins 40 can be easily engaged and disengage from the first bracket 62 and the hanger 38.

With reference now to FIGS. 1–4 and 9–10, the adjustable axle assembly 70 will be discussed in more detail. The adjustable axle assembly 70 includes an axle member 71 having first and second ends 72, 73. Although the axle member 71 can be of any shape chosen with sound engineering judgement, preferably the axle member 71 has an arcuate shape as shown best in FIG. 10. Fixedly attached to the first and second ends 72, 73 of the axle member 71 are first and second castor pivot members 74, 75 each having first and second ends 76, 78 and 77, 79 respectively. The first and second castor pivot members 74, 75 can be of any shape chosen with sound engineering judgement but preferably are cylindrically shaped as shown in the FIGS. 1 and 9–10. The first and second castor pivot members 74, 75 are for use when the front wheels 24 are castor wheels 25. In order to hold the castor wheel 25, the first end 76 of the first castor pivot member 74 has a first castor opening 80 therethrough. Similarly, the second end 77 of the first castor pivot member 74 has a second castor opening 81, The first end 78 of the second castor pivot member 75 has a third castor opening 82 and the second end 79 of the second castor pivot member 75 has a fourth castor opening 83. It is preferred that the first and third castor openings 80, 82 be of a different size than the second and fourth castor openings 81, 83. In this way different sized castor wheels 25 can be mounted to the axle member 71. To make this change in castor wheel size, the axle member 71 must be adjusted as will be discussed further below. A spacer 67 may be inserted into any of the castor openings, 80, 81, 82, 83 that are not being used to receive a castor wheel 25. In this way the castor openings 80, 81, 82, 83 can be protected from any unwanted material.

With reference now to FIGS. 1–5 and 9–10, the adjustable axle assembly 70 may also include articulating means 54 for permitting the axle member 71 to articulate, that is pivot, with respect to the axle housing member 50. Any articulating means 54 chosen with sound engineering judgement may be used in this invention but preferably a bushing 55 is operatively connected to the axle member 71. Preferably the axle housing member 50 has first and second rod openings 53, 57 (shown in FIG. 7) that are aligned with the bushing 55 of the axle member 71. In this way a rod 56 can be inserted through the first rod opening 53, the bushing 55 and then the second rod opening. Once the rod 56 is inserted as just described, the axle member 71 can then pivot or articulate around the rod 56. This permits the front wheels 24 to maintain contact with the ground even when the mower 10 is traveling over uneven terrain.

With reference now to FIGS. 1–8, exchanging the first implement 60 on the mower 10 with the second implement 61, requires the following steps. First, the quick release pin 40 is disengaged thereby disconnecting the first implement 60 from the adjustable frame assembly 30. As noted above, a plurality of quick release pins 40 may be used but each quick release pin 40 is very easy to disengage. Next, the power connecting means 34 is disconnected from the first implement 60. For example, the first belt 85 may be disconnected from the implement pulley 86 in a manner commonly known in the art. The first implement 60 is then removed from the adjustable frame assembly 30 and the second implement 61 is moved into place with respect to the adjustable frame assembly 30. In particular, the second implement 61 may be moved beneath the adjustable frame assembly 30. Then, the quick release pin 40 is engaged thereby operatively connecting the second implement 61 to the adjustable frame assembly 30. Finally, the power connecting means 34 is connected from the power head 11 to the second implement 61. This may include connecting the first belt 85 to a implement pulley (not shown) of the second implement 61. It should be noted that if the second implement 61 is of a different size than the first implement 60, then the adjustable frame assembly 30 may be adjusted with respect to the first and second frame receiving brackets 13, 14 of the power head frame 12. This is accomplished by sliding the first and second side frame members 41, 42 with respect to the first and second frame receiving brackets 13, 14. It should also be noted, that such adjustment of the adjustable frame assembly 30 also adjusts the longitudinal wheel base of the mower 10. In other words, the distance from the axis of the front wheels 24 with respect to the axis of the back wheels 15 can be adjusted. This permits the wheel base to be maintained at a minimum distance regardless of the size of the implement being connected to the mower 10.

With reference now to FIGS. 1–6 and 9–10, it may also be desirable to change the size of the back and front wheel 15, 24 of the mower 10. The back wheels 15 can be changed in a manner commonly known in the art. To change the front wheels 24 however, when they are castor wheels 25, can be done simply as will now be disclosed. FIG. 1 shows the castor wheels 25 mounted to the first and third castor openings in the first ends 76, 78 of the first and second castor pivot members 74, 75. The castor wheels 25 can be exchanged as follows. First, the castor wheels 25 are disconnected from the first and third openings 80, 82 in a manner commonly known in the art. Then the axle member 71 is adjusted with respect to the axle housing member 50 such as by rotating the axle member 71 180°. In this way, the second and fourth castor openings 81, 83 would be directed in downward direction 27 as shown in FIG. 1. Finally, the new castor wheels 25, which may be of a different size, can be connected to the second and fourth castor openings 81, 83. Of course, spacers 67 maybe inserted as required.

The invention has been described with reference to the preferred embodiment. Obviously, modifications and alterations will occur to others upon a reading and understanding of the specification. It is intended by the applicant to include all such modifications and alterations insofar as they come within the scope of the appended claims or the equivalents thereof.

Having thus described the invention, it is now claimed:

1. A method for exchanging a first castor wheel operatively connected to an adjustable axle assembly, the method comprising the steps of:

providing a second castor wheel, the adjustable axle assembly being operatively connected to an associated frame, the adjustable axle assembly including a first castro pivot member operatively connected to an axle member, the first castor pivot member having first and second openings for selectively receiving said first and second castor wheels respectively;

disconnecting said first castor wheel from said first opening of said first castor pivot member;

adjusting the position of said axle member with respect to the associated frame; and, connecting said second castor wheel to said opening of said first castor pivot member.

2. The method of claim 1 wherein, after the step of connecting said second castor wheel to said second opening of said first castor pivot member, the method comprises the step of:

inserting a first spacer within said first opening of said first castor pivot member.

3. The method of claim 1 wherein said axle member is operatively connected to the associated frame by a rod, the step of adjusting the position of said axle member with respect to the frame comprising the steps of:

removing said rod;

rotating said axle member approximately 180°; and, operatively reconnecting said axle member to the associated frame with said rod.

4. The method of claim 1 also for exchanging a third castor wheel operatively connected to said adjustable axle assembly with a fourth castor wheel, said adjustable axle assembly further comprising a second castor pivot member operatively connected to said axle member, said second castor pivot member having third and fourth openings for selectively receiving said third and fourth castor wheels respectively, before the step of adjusting the position of said axle member with respect to the associated frame, the method further comprising the step of:

disconnecting said third castor wheel from said third opening of said second castor pivot member.

5. The method of claim 4, after the step of adjusting the position of said axle member with respect to the associated frame, the method further including the step of:

connecting said fourth castor wheel to said fourth opening of said second castor pivot member.

6. The method of claim 5 further comprising the step of:

inserting a spacer within said third opening of said second castor pivot member.

7. A method for exchanging a first implement operatively connected to a mower with a second implement, the method comprising the steps of:

providing at least one frame receiving bracket and at least one side frame member;

disconnecting said first implement from the mower;

adjusting the mower to accommodate said second implement by moving said at least one frame receiving bracket and said at least one side frame member with respect to one another; and operatively connecting said second implement to the mower.

8. The method of claim 7 wherein, after the step of disconnecting said first implement, the method comprises the step of:

adjusting the wheel base of the mower.

9. The method of claim 7 wherein said first and second implements are operatively connected to the mower by at least one quick release pin, the step of disconnecting said first implement from the mower comprising the step of:

disengaging said at least one quick release pin operatively connecting said first implement to the mower.

10. The method of claim 9 wherein the step of operatively connecting said second implement to the mower comprises the step of:

engaging said at least one quick release pin thereby operatively connecting said second implement to the mower.

11. The method of claim 7 wherein the step of adjusting the mower to accommodate said second implement comprises the step of:

longitudinally adjusting the wheel base of the mower.

* * * * *